United States Patent

Meier et al.

[11] Patent Number: 5,968,299
[45] Date of Patent: Oct. 19, 1999

[54] FOIL COATING ON A LOCAL REGION OF A COMPONENT AND ITS METHOD OF PRODUCTION AND INSTALLATION

[75] Inventors: Reinhold Meier, Dorfen; Erhard Schittenhelm, Schongeising; Martin Thoma, Munich; Anton Albrecht, Andechs/Frieding, all of Germany

[73] Assignee: MTU-Motoren-und Turbinen-Union Munchen GmbH, Munich, Germany

[21] Appl. No.: 08/984,272

[22] Filed: Dec. 3, 1997

[30] Foreign Application Priority Data

Dec. 3, 1996 [EP] European Pat. Off. ............. 96119328

[51] Int. Cl.$^6$ ..................................................... B32B 31/00
[52] U.S. Cl. ........................... 156/155; 156/60; 156/81; 156/85; 29/500; 29/424; 29/471; 29/423; 427/404; 427/419.1
[58] Field of Search .................................. 156/60, 81, 85, 156/155; 29/500, 501, 423, 424, 471; 427/404, 419.1

[56] References Cited

U.S. PATENT DOCUMENTS

| 3,719,608 | 3/1973 | Olstowski | 252/506 |
| 3,876,447 | 4/1975 | Lally | 117/22 |
| 4,173,686 | 11/1979 | Brennan | 429/104 |

FOREIGN PATENT DOCUMENTS

| 4204117 A1 | of 0000 | Germany . |
| 4411677 | of 0000 | Germany . |
| 2115358 | 10/1971 | Germany . |
| 4131871 | 5/1992 | Germany . |
| 63-309389 | 12/1988 | Japan . |
| 2278499 | 4/1975 | United Kingdom . |
| 22 78 499 | 11/1994 | United Kingdom . |
| 9411139 | 5/1994 | WIPO . |

OTHER PUBLICATIONS

Patent Abstracts of Japan vol. 013, No. 148 (M812), Apr. 11, 1989 of JP 63 309389 A (Kawasaki Steel Corp.) Dec. 16, 1988.

*Primary Examiner*—Merrick Dixon
*Attorney, Agent, or Firm*—Ladas & Parry

[57] ABSTRACT

A protective coating is applied on a local region of a surface of a component on which direct deposit of a uniform coating of protective material is impeded due to a complex shape of the region to be covered or inaccessibility or inability to apply a uniform deposition or electrical field therefor. The coating is formed by a foil having a solder backing layer with a thin layer of uniform thickness of the protective material electrolytically deposited on the backing layer, the foil being cut to size corresponding to an area of the local region of the component to be protected. The cut to size foil is positioned and held on the local region of the component to be protected; and fixed in place by melting the solder to fuse the foil to the component and cover the local region.

8 Claims, 3 Drawing Sheets

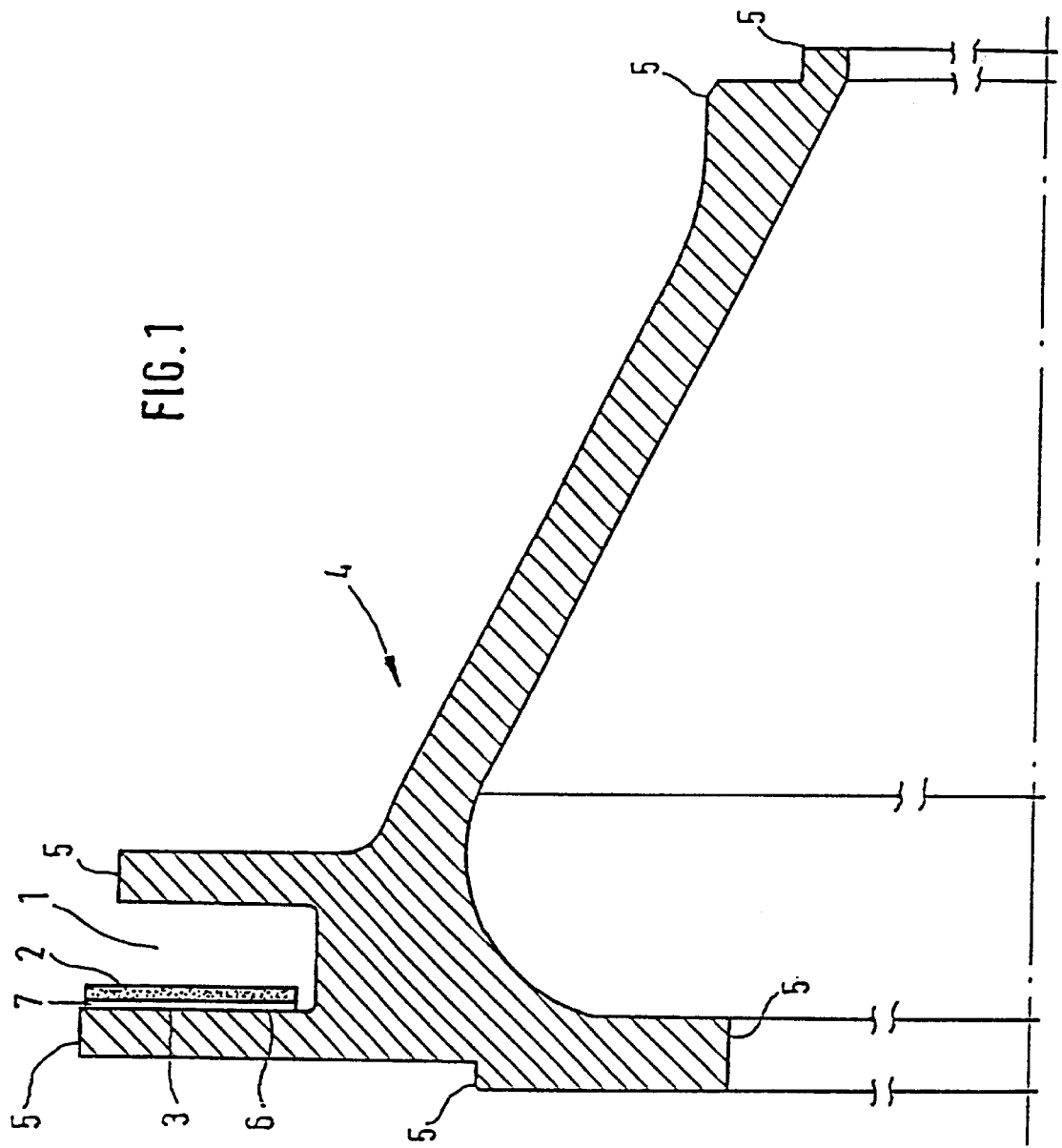

FOIL COATING ON A LOCAL REGION OF A COMPONENT AND ITS METHOD OF PRODUCTION AND INSTALLATION

FIELD OF THE INVENTION

The invention relates to coatings applied to local regions of components, such as elements of a drive unit, for example, a turbine.

More particularly, the invention relates to foil coatings and to methods for their production and installation at the local regions of the components.

BACKGROUND AND PRIOR ART

When components are to be coated for various reasons only in local regions, usually the regions of the component that are not to be coated must be covered prior to coating, with a protective layer. For protection of components of titanium alloy from oxidation, DE 4,204,117 discloses applying an oxidation-resistant foil thereon. U.S. Pat. No. 3,876,447 discloses application of a sheet or mat to a substrate.

The type of protection layer applied to the regions not to be coated and the process of application essentially depends on the type of coating to be applied in the local region and in its process of application. For protecting the uncoated regions prior to applying an electrolytic coating thereon, wax layers are applied to the regions not to be coated, as disclosed in DE 4,411,677. Also usable are lacquer layers including photoresist layers. For applying gas-phase coatings in local regions of components of turbine drive units, extremely complex built-up protective layers have been developed. However, the larger the surface to be protected relative to the surface to be coated in the local region, the less economical is the employment of local or regional coating processes of the known type which employ protective layers on the surfaces of the component that are not to be coated.

The coating applied to local areas may also be adversely affected by the configuration of the components, particularly when projecting parts of the component that are not to be coated cover the regions that are to be coated during the coating process, such as vacuum metalizing or spraying whereas for coating processes, such as powder coating or electroplating, the regions to be coated are blocked or obscured so that the coating material may not reach the region to be coated, or the coating material may not be uniformly deposited due to irregularity of distribution of the electrical field. Furthermore, the coatings may be applied more thickly in the coating processes in the exposed areas of the component as compared to areas in which application of the coating is impeded, and particularly due to peaks in field intensity during electroplating or powder deposit. In the case of compound coatings, for example, comprised of a metal matrix containing ceramic, mechanically-resistant particles, there is also the danger that the composition of the coating will not be applied homogeneously. For example, the incorporation of mechanically-resistant particles may not be uniformly distributed and thus can vary in quantity in the coating.

A coating in regions of complex configuration of the component may thus lead to non-uniform thickness of the coating, coating anomalies, and an absence of coating, despite great technical effort with conventional costly covering technologies associated with the corresponding conventional regional deposition or application techniques.

SUMMARY OF THE INVENTION

An object of the invention is to provide a process for coating a local area of a component, which can be of complex configuration, and which overcomes the disadvantages of the known art and allows the coating of large surface regions of the component, particularly for coating processes, which would otherwise produce non-uniform coating layers.

A further object of the invention is to provide such a process in which the application of a covering or protective layer on the regions that are not to be coated is rendered unnecessary.

A further object of the invention is to provide a process and apparatus by which a uniform protective coating can be applied on a local region of a surface of a component on which direct deposition of a uniform coating of protective material is impeded.

The above and further objects are achieved by a process comprising the following steps:

(a) electrolytically depositing a thin layer of protective coating material onto a self-contained solder foil;

(b) cutting the thus coated solder foil to a size corresponding to the local region of the component to be coated with protective material;

(c) positioning and securing the coated solder foil on the local region of the component to be coated, and (d) heating the component to melt the solder and fuse the foil to the component so that the layer of coating material is joined to said component and covers and protects said local region of the component.

This process has the advantage that instead of coating the complexly configured surface of a component, only a completely uniform surface of a self-contained solder foil is coated, so that the problems of blocking or screening of the regions to be coated or of accumulation of coating material at exposed areas no longer occurs.

A uniform surface of a solder foil also has the advantage that even brittle and somewhat "thick" thin layers can be uniformly applied thereto, completely homogeneously as regards thickness and composition.

The step of a precisely adapted, true-to-size cutting of the coated solder foil for the local regions to be coated has the advantage that the need for applying a protective layer on the regions of the component not to be coated is eliminated.

The positioning of the coated solder foil on the local regions of the component to be coated may be achieved with conventional equipment, such as micromanipulators, positioning robots, and the like. Attachment of the coated solder foil onto the local region of the component to be coated is obtained by tacking, spot welding, pressure connecting, mechanical clamping, gluing by flux agents or the like.

The process of the invention has particular advantages when comparing the electrolytic deposition of the thin protective coating on the solder foil to the direct electrolytic deposition of the coating onto the component. In this regard, extremely great difficulties arise in locally coating complexly configured components by electrolytic deposition since the electrical field strength can be completely or partially blocked by projections on the component. An excessively thick electrolytic deposition may be produced on exposed surfaces or edges to be coated, since peaks in the field strength occur on these exposed surfaces, which lead to increased deposition or increased rate of deposition. In the blocked or impeded areas, the deposition is diminished. This non-uniformity of deposition is avoided by the use of a uniform solder foil as a deposition substrate.

The disadvantages in vacuum metalizing, spraying or powder deposition of coating material onto local regions of a complexly configured component are overcome in a similar way. In these cases, the coating is preferably vacuum deposited, sprayed, or powder deposited onto the solder foil.

In a preferred embodiment of the process, an abrasion-resistant material is applied onto the solder foil as a thin layer. Abrasion-resistant materials are extremely brittle and normally are comprised of several components, which may separate during conventional local coating processes, whereby concentrations of one component may occur at specific places of the region to be coated. These problems are overcome by the invention by uniformly coating the solder foil with the abrasion-resistant material. Also, the solder foil provides the brittle coating with an improved toughness, elasticity and ductility during further processing by combining or joining the accurately adapted, true-to-size, cut and coated solder foils with the surfaces of the component in the regions to be coated.

Heat-insulating layers, which are usually made of ceramics, such as a zirconium-oxide base material or an aluminum-oxide base material, are usually extremely brittle, so that the process of the invention may be advantageously employed when a thin layer of a heat-insulating material is coated onto the solder foil.

Components that are subject to corrosion due to hot gases, such as components disposed in the flow of hot gases in the flow channel of drive units, such as turbines, require coatings of materials that are resistant to corrosion by hot gases, such as materials based on aluminum and/or chromium. In such case, a material that is resistant to corrosion by hot gases is applied as a thin layer onto the solder foil.

Other regions of a component in drive units may be endangered by corrosion due to friction, such as, for example, surfaces of rotor feet, or surfaces of blade shroud segments of turbines, and the surfaces of the rotor disks and rotor vanes opposite them. In these cases, a material that is resistant to friction corrosion is applied onto the solder foil as the thin protective layer.

In another embodiment of the invention, a cobalt-base material containing mechanically resistant particles of chromium trioxide ($Cr_2O_3$) is applied onto the solder foil as the thin layer. These layers are characterized by a particularly high volumetric fraction of said chromium trioxide particles of between 2 to 30 vol. % of a particle size of 1 to 15 $\mu$m. Due to the high volumetric fraction of the mechanically resistant particles of $Cr_2O_3$, there is the associated danger of a separation of the particles when applying the coating directly onto the local area of the component to be coated by means of conventional electroplating technology, since the mechanically-resistant particles are suspended in the electrolytic bath and cannot be applied uniformly in the coated regions of the component when the component is of complex configuration. In contrast, according to the invention, the amount of mechanically-resistant particles can be applied uniformly on the self-contained solder foil and a completely homogeneous coating thickness can be obtained. The transfer of the abrasion layer on the solder foil onto the regions of the component to be coated is achieved by the other process steps of the invention.

In further accordance with the invention, the coated solder foil is cut to size by means of a laser beam. Laser cutting techniques have the advantage that even hard and brittle thin layers can be cut to size accurately on a soft and elastic solder foil. Furthermore, the laser cutting techniques do not abrade the cutting tools and can be fully automated for large numbers of pieces with uniformly high precision.

In the construction of drive units, such as turbines, it is a problem if, after operation of the drive unit, the service intervals must be shortened due to abrasion of difficult-to-protect regions of a component or if the service life of the entire drive unit must be reduced due to very different problems, such as erosion, hot-gas or friction corrosion, or diffusion embrittlement from oxygen or hydrogen, which frequently occur in regions of components and parts of complex configuration. With the present invention, these critical regions of the component can be improved subsequently, without subjecting the entire component to an application of expensive overall protective coating and formation of a local coating as in the conventional process. The local protection of a drive unit can be effected according to the present invention during major overhauls or when producing new parts.

Components with coatings in local regions may be produced by the process of the invention, particularly where the region of the component to be coated is on a complex configured surface with exposed edges and with blocked or partially concealed regions, the coating being applied to the region of the component by the intermediate solder layer. In particular, in the case of critical coating processes, such as electroplating, where peaks in field strength occur on the exposed component regions and the field strength is impeded at the concealed or blocked regions of the component, the component of the invention has the advantage that such coating processes are not executed directly on the component, but that the component is only subjected to a heating operation to fuse the solder foil thereto so that the component is provided with a completely uniform local coating that is homogeneous in its composition, via the intermediate solder layer.

In a preferred embodiment of the invention, the coating is an electrolytically deposited layer on a solder foil. Since electrolytic layers of non-uniform thickness will be obtained by direct deposit thickness on a component of complex surface configuration, or where there is a variation in field strength due to obscured and exposed regions of the component, the resulting non-uniform thickness layer must be post-processed to make the layer thickness uniform. Advantageously, this is not necessary for the component of the invention, since despite the electrolytically deposited coating, complete uniformity of the thickness of the coating is achieved according to the invention without need for subsequent processing.

According to another preferred embodiment of the invention, the coating on the solder foil is comprised of an abrasion-resistant material. Such materials cannot be directly produced with conventional means on a local region of a component of complex configuration, since these coatings are comprised of several components, which tend to separate and render the coating non-uniform. However, in the case of the component of the invention, the regional or local coating of abrasion-resistant material remains completely uniform in composition.

Particularly preferred coatings resistant to abrasion comprise a cobalt-base material containing particles of $Cr_2O_3$. When such a composition is directly applied onto a component region, a separation of the components takes place in the conventional direct deposit technique described above, so that an agglomeration of mechanically-resistant particles occurs in the exposed areas. In contrast, the coating on the solder foil and thus on the critical abrasion-subjected region of the component is a completely homogeneous composition, in which the volume of $Cr_2O_3$ is between 20 and 30% and the particle size is between 1 and 15 $\mu$m.

A preferred field of application of the components of the invention is in drive units of a turbine. Improvements in the service life of the turbine can be achieved, if in critical regions of a component subject to abrasion, an abrasion-resistant coating is applied according to the invention. It is particularly preferred if the local region of the component to be coated is in the inside surface of a radial, annular groove of a support ring for receiving vane shroud segments of the turbine. In the operation of the drive unit, the inside surface of the annular groove which is subject to abrasion, is protected by the abrasion resistant layer thereon according to the invention.

BRIEF DESCRIPTION OF THE DRAWING

The following figures of the drawing show in comparison a preferred embodiment of the invention and an embodiment showing the state of the art in order to describe the invention in greater detail.

FIG. 1 is a longitudinal, cross-section through an annular component of a turbine drive unit in which a coating has been applied to a local region in accordance with the invention.

DETAILED DESCRIPTION

Figure 3:
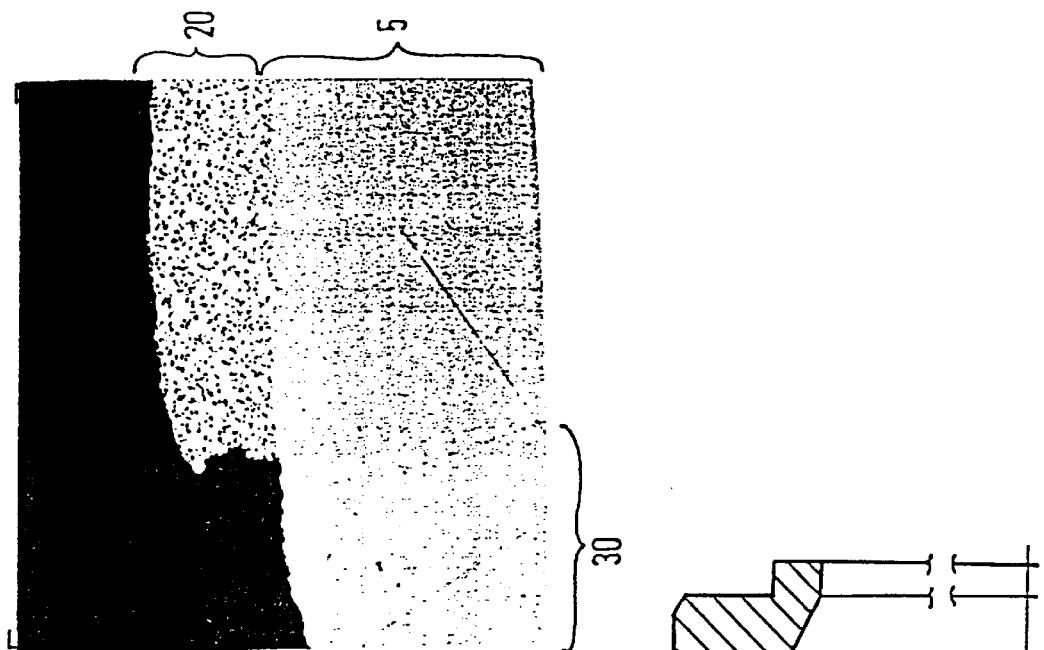
FIG. 3 is a photographic enlargement on a scale of 200:1 of the coating in FIG. 2.

FIG. 1 shows an annular component 4 with a radial, outwardly open, annular groove 1 having a coating 2 applied to an inner radial face 3 by a process according to the invention. Annular groove 1 is arranged at the outer periphery of annular component 4 of a turbine and is adapted to receive blade feet or vane shroud segments. The region of component 4 to be coated lies on a complexly configured surface segment having freely exposed edges 5 and shielded or concealed regions 6. The coating 2 is joined by an intermediate solder layer 7 to the region of the component to be coated, i.e. face 3 in annular groove 1. The intermediate solder layer 7 and the coating 2 form a self-contained unit independently applied to the region of the component to be coated. The unit is a cut-to-size portion of a large solder foil which is uniformly coated with coating 2. The self-contained, cut-to-size unit is applied to the component 4 at the face to be coated and soldered to the face of the component. In this example, a self-contained, high-melting temperature solder foil was used, one side of which was coated with an abrasion-resistant layer (coating 2) in order to form the self-contained unit. The positioning and attaching of the accurately adapted, cut-to-size unit onto the region of component 4 to be coated may be facilitated by a coating of flux agent applied to the back surface of the foil. In this embodiment, after positioning, the cut-to-size coated, solder foil on the local region of the component to be protected, the foil is permanently joined to the component. Since such varied processes as vacuum metalizing or spraying or coating in conjunction with an electrical field, such as in powder depositing and electroplating onto a surface of a self-contained foil produce substantially more uniform coatings as regards composition and thickness of the coating compared to the direct deposition of coating on complex surface shapes of components with exposed edges and concealed or shielded regions, the cut-to-size unit of the self-contained solder foil will provide a coating of uniform thickness and composition, so that the component region to be coated will be provided with a coating of uniform thickness and composition by the process of the invention. The dimensional accuracy of the thickness is achieved by improved coating conditions and the dimensional accuracy of the coating region on the component is obtained by the separate process step of cutting the coated solder foil to size according to the invention and accurately positioning and joining the foil to the component region to be coated.

The previously known processes are extremely costly, due to the necessity of covering all regions of the component part, not to be coated, with the protective coating, since the component surface to be is of complex configuration and is substantially larger in area than the local region of the component to be coated.

Figure 2:
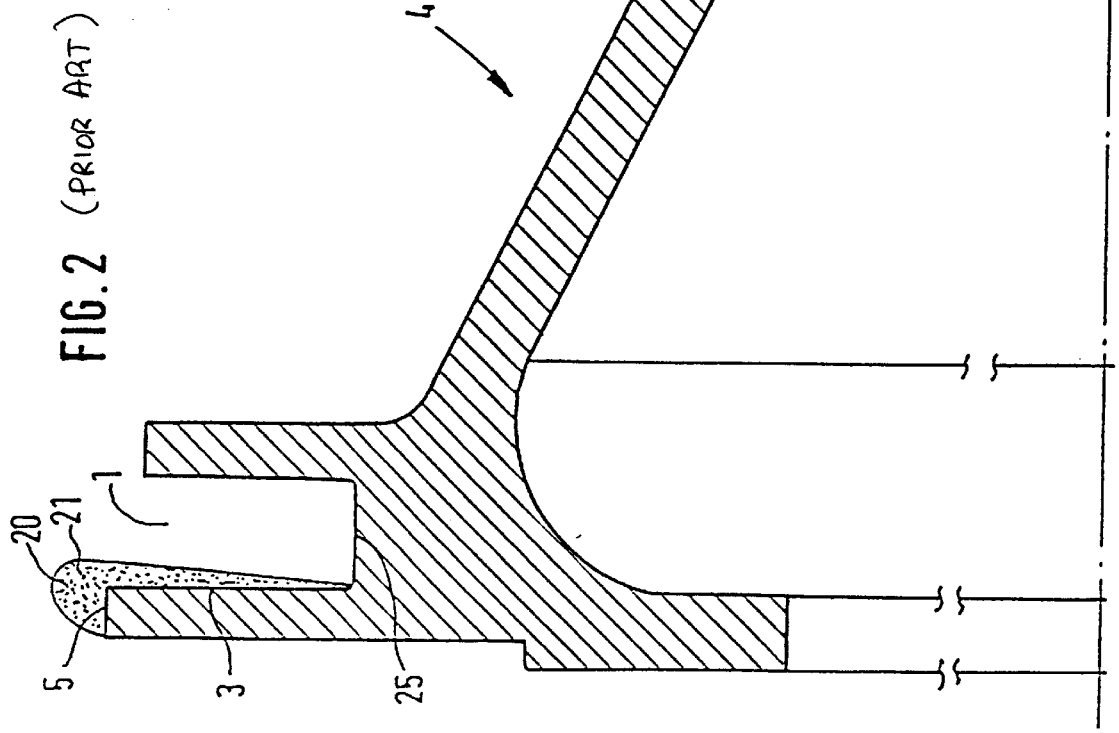
FIG. 2 shows the component of FIG. 1 in which the local region has been coated according to the prior art.

FIG. 2 shows the component of FIG. 1 after application of a layer 20 on face 3 by a conventional electroplating process, in which mechanically-resistant particles 21, suspended in a matrix of the electrolytic bath have become separated. The component region to be coated is the same as FIG. 1. It can be clearly seen in FIG. 2 that the coating thickness on the inner face 3 of annular groove 1 to be coated decreases from the exposed outer edge 5 to the base 25 of the groove. Also, the incorporated, deposited mechanically-resistant particles, which are comprised of $Cr_2O_3$ in this example and which constitute between 20 and 30 vol. % of the coating, are not uniformly distributed in the coating. It is clear also in this example that a considerable expenditure is necessary to protect the surface regions of the component 4 that are not to be coated prior to the coating operation and to remove the protective layer after the coating operation has been completed.

FIG. 3 shows a photographic enlargement on a scale of 200:1 of coating 20 in FIG. 2. It is seen that the coating is partly broken away and chipped off of coated component 5 in portion 30. On the one hand, there is an extremely non-uniform coating thickness and coating composition, which produces material stresses in the coating and favors crack formations, and on the other hand, there is an extremely brittle layer of material, which is applied in this example intended to increase abrasion resistance. A post-processing of the very non-uniformly applied coating in order to make the thickness of the layer uniform is thus extremely difficult.

Figure 4:
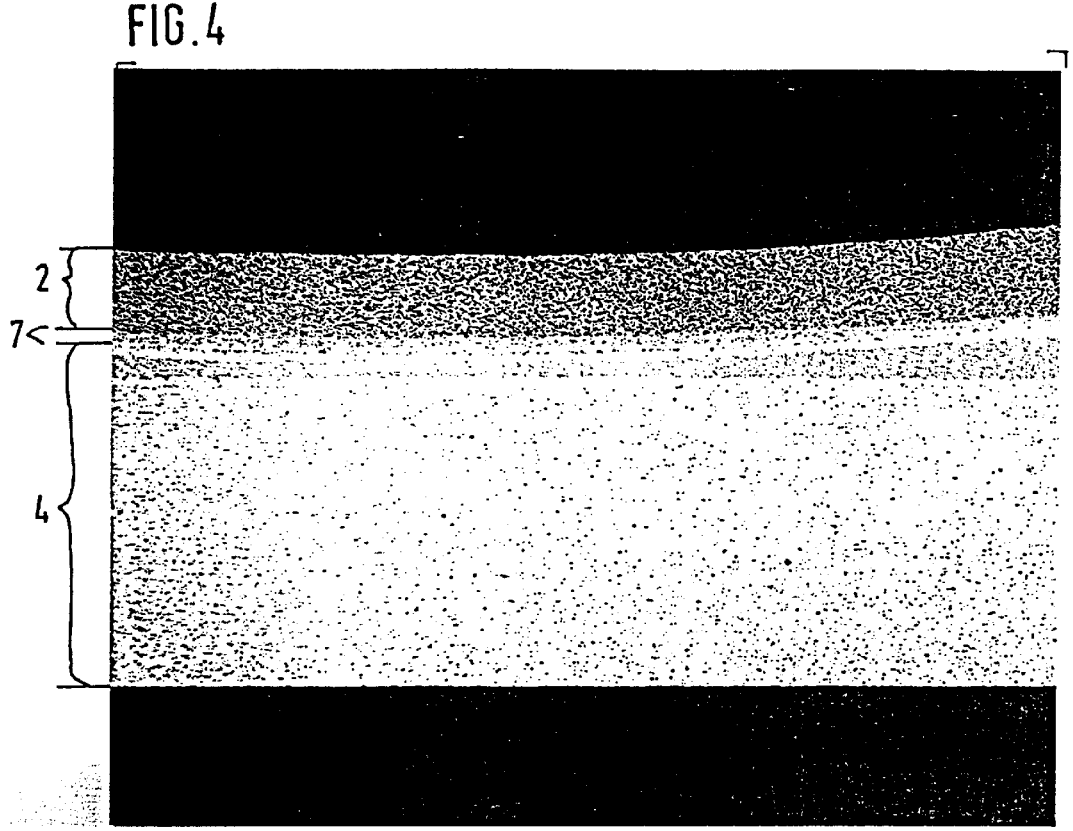
FIG. 4 is a photographic enlargement on a scale of 200:1 of the coating in FIG. 1.
Figure 5:
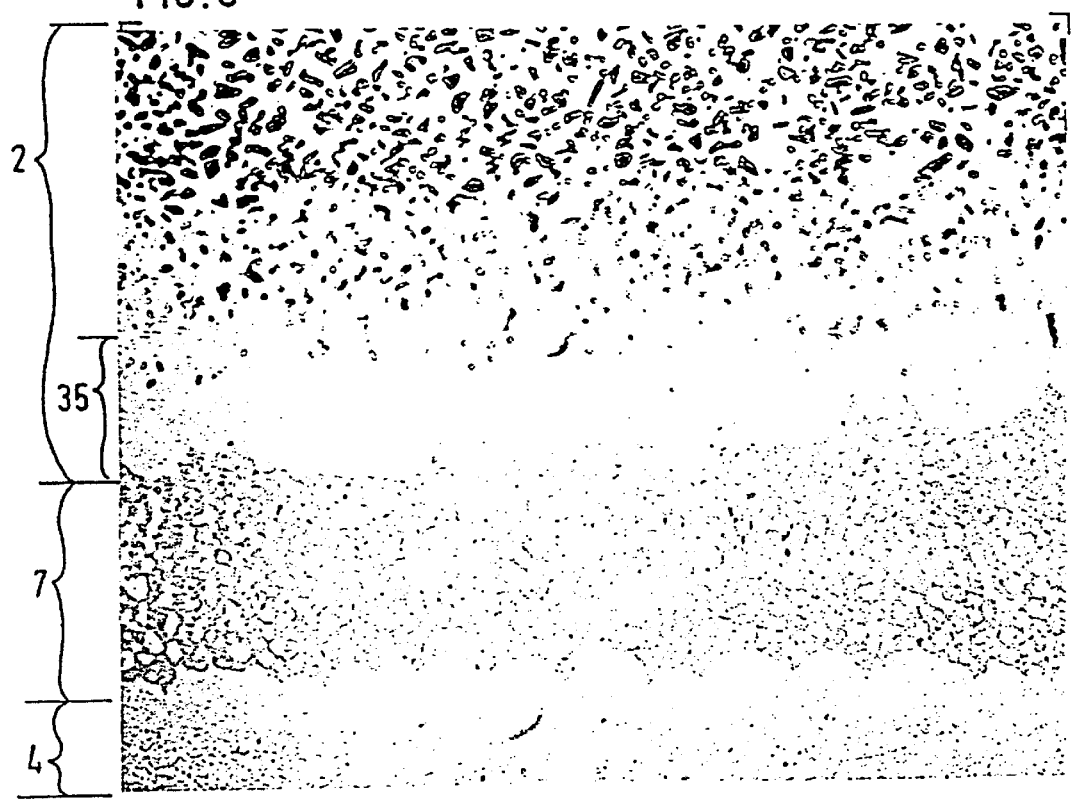
FIG. 5 is a photographic enlargement on a scale of 2000:1 of the coating in FIG. 1.

FIG. 4 shows a photographic enlargement on a scale of 200:1 of regional coating 2 of FIG. 1. It can be clearly seen that the thickness of the coating is uniform. Only a thin intermediate solder layer 7 remains from the self-contained solder foil. A photographic enlargement on a scale of 2000:1 of the regional coating of FIG. 1 is shown in FIG. 5, where, in particular, the boundary region between component 4 and intermediate solder layer 7 and abrasion-resistant coating 2 is shown in section. An interface 35 has formed between intermediate solder layer 7 and coating 2, and this essentially comprises the matrix material of the coating and solder alloy components which form a transition between the elastic material of component 4 having a high thermal coefficient of expansion with the ductile intermediate solder layer 7 thereon and the brittle abrasion-resistant coating 2 of lower coefficient of thermal expansion. In addition, the intermediate solder layer 7 becomes interspersed both with the substrate 4 as well as the coating 2, which considerably improves the adhesion and the holding power of the layer on the substrate as compared to direct deposit coatings as shown in FIGS. 2 and 3.

The coated foil unit composed of the solder foil 7 and the coating layer 2 is produced by depositing the metal g layer 2 on the solder foil, as a backing layer, by various processes g electrodeposition as previously discussed and the coated foil is cut to size to correspond to the local area of the component to be covered. The cut to size foil unit is second in place to the component and fixed thereto by melting the solder layer to fuse the foil unit to the component.

Although the invention has been described with reference to embodiments thereof, variations and modifications will become apparent to those skilled in the art which will fall within the scope of the appended claims.

What is claimed is:

1. A process for applying a protective coating on a local region of a surface of a gas turbine component on which direct deposit of a uniform coating of protective material is impeded, said process comprising:

forming a foil having a solder backing layer with a thin layer of protective material of uniform thickness electrolytically deposited substantially on an entire surface of said backing layer;

said protective material having a composition to resist high temperature gas flow in the gas turbine component during operation of the gas turbine, cutting said foil to size corresponding to an area of a local region of the component to be protected;

positioning and securing the cut to size foil on the local region of the component to be protected; and fixing said foil to said region of said component by melting the solder on the entire surface of the backing layer of the foil to fuse the foil to said component entirely over said region of the component to be protected so that said layer of protective material is joined to said component and is fused on and covers said local region of the component.

2. A process as claimed in claim 1, comprising forming said layer of protective material as an abrasion resistant material.

3. A process as claimed in claim 1, comprising forming said layer of protective material as a heat insulating material.

4. A process as claimed in claim 1, comprising forming said layer of protective material as a hot gas corrosion resistant material.

5. A process as claimed in claim 1, comprising forming said layer of protective material as a friction corrosion resistant material.

6. A process as claimed in claim 1, wherein said foil is cut by a laser beam.

7. A process as claimed in claim 1, wherein said protective coating is composed of material for increasing service life of said component.

8. A process as claimed in claim 1, wherein said foil is itself thin and flexible for adapting itself to a complex shape of the component in the region thereof to be protected against the hot gas flow.

* * * * *